No. 672,290. Patented Apr. 16, 1901.
H. VON SCHUCKMANN.
HARROW.
(Application filed Mar. 21, 1899.)
(No Model.)
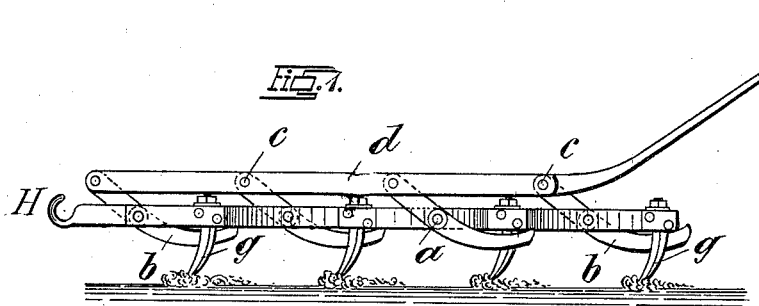
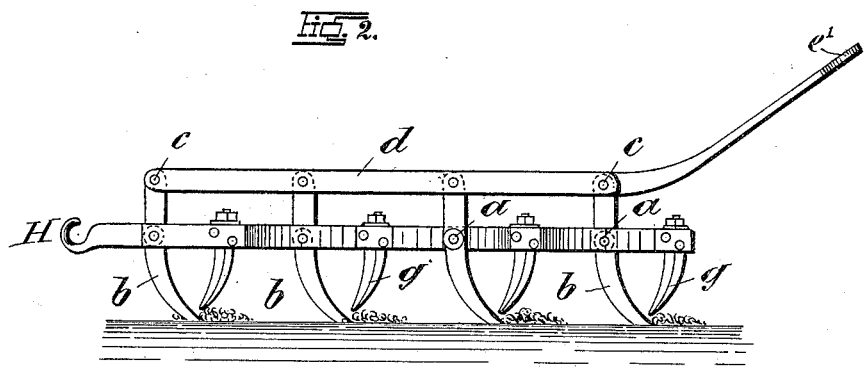
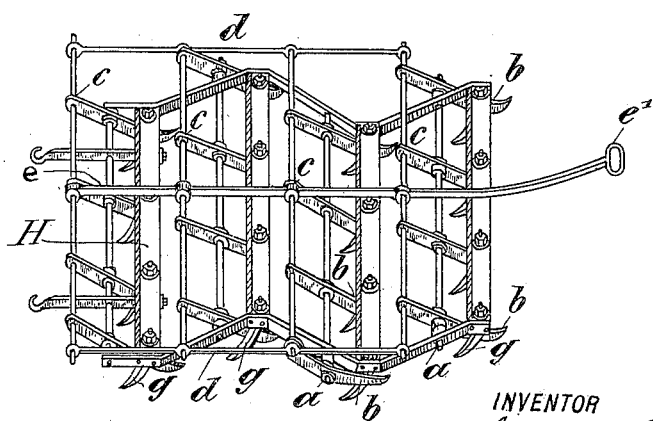
WITNESSES:
INVENTOR
Hermann von Schuckmann
BY
ATTORNEYS.

UNITED STATES PATENT OFFICE.

HERMANN VON SCHUCKMANN, OF AURAS, GERMANY.

HARROW.

SPECIFICATION forming part of Letters Patent No. 672,290, dated April 16, 1901.

Application filed March 21, 1899. Serial No. 709,898. (No model.)

*To all whom it may concern:*

Be it known that I, HERMANN FREIHERR VON SCHUCKMANN, a citizen of Germany, residing at Auras, Silesia, Germany, have invented certain new and useful Improvements in Harrows, of which the following is a specification.

This invention relates to harrows, the object being to provide means for clearing the teeth of the same from stones, leaves, sticks, &c., or such things as usually clog the teeth and prevent their effective harrowing action, this being accomplished during the working of the harrow, so that the farmer does not have to stop his work.

The invention consists of certain features of construction and combinations of parts to be hereinafter described and then claimed.

In the accompanying drawings, Figure 1 is a side elevation of my improved harrow in harrowing position. Fig. 2 is a side view of the same just after the clearing of the teeth, and Fig. 3 is a perspective plan view.

Similar letters of reference indicate corresponding parts.

Referring to the drawings, H indicates the frame of a harrow provided with the usual teeth $g$.

$b$ indicates a number of pivoted clearer-teeth, somewhat longer than teeth $g$ and pivoted to the frame by means of shafts $a$, which are journaled in the frame and extend transversely of the same parallel with the transverse beams of the frame. The clearer-teeth are extended above their pivot-shafts and the clearer-teeth of each gang or row connected by a rod $c$, which rods $c$ in turn are connected by means of connecting-rods $d$ at their ends at each side of the harrow. Between the connecting-rods $d$ a draw-rod $e$, provided at its rear end with a handle $e'$, is arranged and through which the rods $c$ loosely pass; but the handle may, if desired, be formed on one of the side rods $d$.

Through a pull on the handle $e'$ a downward-and-forward movement is imparted to the clearer-teeth $b$, so that the same move between the harrow-teeth $g$, and as they are longer than the teeth $g$ they will clear them entirely of any accumulation, this being permitted by reason of the fact that by the greater length of the teeth $b$ the harrow-teeth are raised clear of the ground. The teeth $b$ may hence be properly termed "lifting-teeth." When the harrow is in the position shown in Fig. 2, the harrow rests on the teeth $b$, the accumulated leaves, stones, &c., having been stripped from the harrow-teeth. The harrow-teeth will also have been raised so far that as the harrow moves forward the teeth will clear the stripped-off accumulation. The farmer now lets go of the handle $e'$, and under the influence of the weight of the harrow the clearer-teeth and operating parts will be returned to the normal position, (shown in Fig. 1,) while the teeth of the harrow will rest upon the ground, and as the harrow passes along they break up clods, as usual.

A farmer provided with the described harrow does not have to stop to clear the teeth of the same, nor to break in upon his work; but one can clear the harrow-teeth as often as desired without stopping the forward movement of the harrow.

Having thus described my invention, what I claim as new, and desire to secure by Letters Patent, is—

1. In a harrow, the combination, with the frame and teeth, of lifting clearer-teeth pivoted to said frame and being longer than the harrow-teeth, and means for simultaneously operating the lifting clearer-teeth, substantially as set forth.

2. In a harrow, the combination, with the frame and teeth, of pivoted lifting clearer-teeth arranged between and of greater length than the harrow-teeth and having upward extensions, and means connected with said extensions for oscillating said lifting clearer-teeth, substantially as set forth.

In witness whereof I have hereunto set my hand in presence of two witnesses.

HERMANN VON SCHUCKMANN.

Witnesses:
  WILHELM WEIDNER,
  HERMANN BARTSCH.